United States Patent
Zhang et al.

(10) Patent No.: US 12,360,129 B2
(45) Date of Patent: Jul. 15, 2025

(54) APPARATUS AND METHOD FOR INDICATING REAGENT STATUS AND TISSUE PROCESSOR

(71) Applicant: LEICA BIOSYSTEMS NUSSLOCH GMBH, Nussloch (DE)

(72) Inventors: Bao Zhang, Shanghai (CN); Lingjun Xie, Shanghai (CN)

(73) Assignee: Leica Biosystems Nussloch GmbH, Nussloch (DE)

( * ) Notice: Subject to any disclaimer, the term of this patent is extended or adjusted under 35 U.S.C. 154(b) by 696 days.

(21) Appl. No.: 17/279,223

(22) PCT Filed: Oct. 31, 2019

(86) PCT No.: PCT/EP2019/079937
§ 371 (c)(1),
(2) Date: Mar. 24, 2021

(87) PCT Pub. No.: WO2020/089441
PCT Pub. Date: May 7, 2020

(65) Prior Publication Data
US 2022/0034924 A1 Feb. 3, 2022

(30) Foreign Application Priority Data
Nov. 2, 2018 (CN) .................. 201811300958.7

(51) Int. Cl.
*G01N 35/00* (2006.01)
*G01N 1/31* (2006.01)

(52) U.S. Cl.
CPC ........ *G01N 35/00732* (2013.01); *G01N 1/31* (2013.01); *G01N 35/00663* (2013.01); *G01N 2035/00673* (2013.01); *G01N 2035/00811* (2013.01); *G01N 2035/009* (2013.01)

(58) Field of Classification Search
None
See application file for complete search history.

(56) References Cited

U.S. PATENT DOCUMENTS

| | | | |
|---|---|---|---|
| 5,389,339 A | 2/1995 | Petschek et al. | |
| 2010/0112624 A1* | 5/2010 | Metzner | G01N 1/31 435/29 |

(Continued)

FOREIGN PATENT DOCUMENTS

| CN | 105283767 A | 1/2016 |
|---|---|---|
| CN | 206114669 U | 4/2017 |

(Continued)

*Primary Examiner* — P. Kathryn Wright
(74) *Attorney, Agent, or Firm* — Kinney & Lange, P.A.

(57) ABSTRACT

An apparatus and a method for indicating a reagent status in a reagent bottle in a tissue processor and a tissue processor are provided. The apparatus includes a detector, a controller, and an indicator. The detector is configured to detect the reagent status. The controller is configured to generate a control signal based on the reagent status. The indicator is configured to generate a signal for indicating the reagent status based on the control signal. The apparatus may intuitively indicate the reagent status for an operator, such that the operator may replace the reagent timely and accurately, avoiding reagent replacement error.

14 Claims, 7 Drawing Sheets

(56) References Cited

U.S. PATENT DOCUMENTS

| | | | | |
|---|---|---|---|---|
| 2010/0115463 A1* | 5/2010 | Kondou | ................ | B01L 3/527 |
| | | | | 715/803 |
| 2016/0146846 A1 | 5/2016 | Fujita et al. | | |
| 2018/0003600 A1* | 1/2018 | Neef | ................ | G01N 35/00732 |
| 2018/0172715 A1 | 6/2018 | Yamamoto et al. | | |
| 2020/0096526 A1* | 3/2020 | Suter | ................ | G06Q 50/28 |
| 2020/0174029 A1* | 6/2020 | Sears | ................ | B01L 3/16 |

FOREIGN PATENT DOCUMENTS

| | | |
|---|---|---|
| CN | 207163796 U | 3/2018 |
| EP | 3153865 A1 | 4/2017 |
| JP | 2003028769 A | 1/2003 |
| JP | 2008070259 A | 3/2008 |
| JP | 2013140022 A | 7/2013 |
| JP | 2018096916 A | 6/2018 |
| WO | 2015005356 A1 | 1/2015 |
| WO | WO-2018051672 A1 * 3/2018 ............. G01N 35/00 |

\* cited by examiner

APPARATUS AND METHOD FOR INDICATING REAGENT STATUS AND TISSUE PROCESSOR

FIELD

The present disclosure relates to a technical field of tissue processors, and more particularly to an apparatus for indicating a reagent status in a reagent bottle in a tissue processor, a method for indicating a reagent status in a reagent bottle in a tissue processor and a tissue processor.

BACKGROUND

A tissue processor is a device for processing (e.g. fixing, dehydration, clearing, embedding, etc.) specimens by automatically exposing the specimens to a sequence of reagents in its processing retort. However, the reagents are consumed in a procedure of processing the specimens.

SUMMARY

The present disclosure aims to solve at least one of the problems in the related art to at least some extent.

Accordingly, a first objective of the present disclosure is to provide an apparatus for indicating a reagent status in a reagent bottle in a tissue processor. The apparatus may intuitively indicate the reagent status for an operator, such that the operator may replace the reagent timely and accurately, avoiding reagent replacement error.

A second objective of the present disclosure is to provide a method for indicating a reagent status in a reagent bottle in a tissue processor.

A third objective of the present disclosure is to provide a tissue processor.

In order to realize the above objectives, embodiments of the present disclosure provide an apparatus for indicating a reagent status in a reagent bottle in a tissue processor. The apparatus includes: a detector, a controller, and an indicator. The detector is configured to detect the reagent status. The controller is configured to generate a control signal based on the reagent status. The indicator is configured to generate a signal for indicating the reagent status based on the control signal.

In at least one embodiment of the present disclosure, the indicator includes a plurality of display modules. The plurality of display modules is in one-to-one correspondence with a plurality of reagent bottles in the tissue processor.

In at least one embodiment of the present disclosure, each of the plurality of display modules includes at least one signal lamp. The at least one signal lamp is configured to emit predetermined light based on the control signal.

In at least one embodiment of the present disclosure, the predetermined light includes one of light with a first predetermined color, light with a second predetermined color, and light that flashes at a predetermined flashing frequency.

In at least one embodiment of the present disclosure, when the reagent status is within a threshold range, the controller is configured to generate a first control signal, and the at least signal lamp is configured to emit the light with the first predetermined color based on the first control signal; when the reagent status is within a forewarning threshold range, the controller is configured to generate a second control signal, and the at least signal lamp is configured to emit the light with the second predetermined color based on the second control signal; and when the reagent status is within an alarm threshold range, the controller is configured to generate a third control signal, and the at least signal lamp is configured to emit the light that flashes at the predetermined flashing frequency based on the third control signal.

In at least one embodiment of the present disclosure, the plurality of display modules serves as backlight modules of the plurality of reagent bottles, respectively.

In at least one embodiment of the present disclosure, the indicator includes a plurality of buzzers. The plurality of buzzers is in one-to-one correspondence with a plurality of reagent bottles in the tissue processor. The plurality of buzzers is configured to emit a sound signal with a predetermined frequency based on the control signal.

In at least one embodiment of the present disclosure, the detector is further configured to detect whether the reagent bottle is placed in the tissue processor; the controller is further configured to generate a turn-off signal when detecting that the reagent bottle is not placed in the tissue processor; the indicator is further configured to turn off the signal for indicating the reagent status based on the turn-off signal.

In at least one embodiment of the present disclosure, the apparatus further includes: a touch control screen, configured to synchronously display the signal for indicating the reagent status.

In order to realize the above objectives, embodiments of the present disclosure provide a method for indicating a reagent status in a reagent bottle in a tissue processor. The method includes: detecting the reagent status; generating a control signal based on the reagent status; and generating a signal for indicating the reagent status based on the control signal.

In at least one embodiment of the present disclosure, generating the signal for indicating the reagent status based on the control signal, includes: emitting predetermined light based on the control signal.

In at least one embodiment of the present disclosure, the predetermined light includes one of light with a first predetermined color, light with a second predetermined color, and light that flashes at a predetermined flashing frequency.

In at least one embodiment of the present disclosure, emitting the predetermined light based on the control signal, includes: when the reagent status is within a threshold range, emitting the light with the first predetermined color; when the reagent status is within a forewarning threshold range, emitting the light with the second predetermined color; and when the reagent status is within an alarm threshold range, emitting the light that flashes at the flashing predetermined frequency.

In at least one embodiment of the present disclosure, generating the signal for indicating the reagent status based on the control signal, includes: emitting a sound signal with a preset frequency based on the control signal.

In at least one embodiment of the present disclosure, the method further includes: detecting whether the reagent bottle is placed in the tissue processor; generating a turn-off signal when detecting that the reagent bottle is not placed in the tissue processor; turning off the signal for indicating the reagent status based on the turn-off signal.

Finally, embodiments of the present disclosure provide a tissue processor, including any one of the above apparatuses.

DETAILED DESCRIPTION

Reference will be made in detail to embodiments of the present disclosure. Embodiments of the present disclosure will be illustrated in drawings, in which the same or similar elements and the elements having same or similar functions are denoted by like reference numerals throughout the descriptions. The embodiments described herein according to drawings are explanatory and illustrative, not construed to limit the present disclosure.

Figure 1:
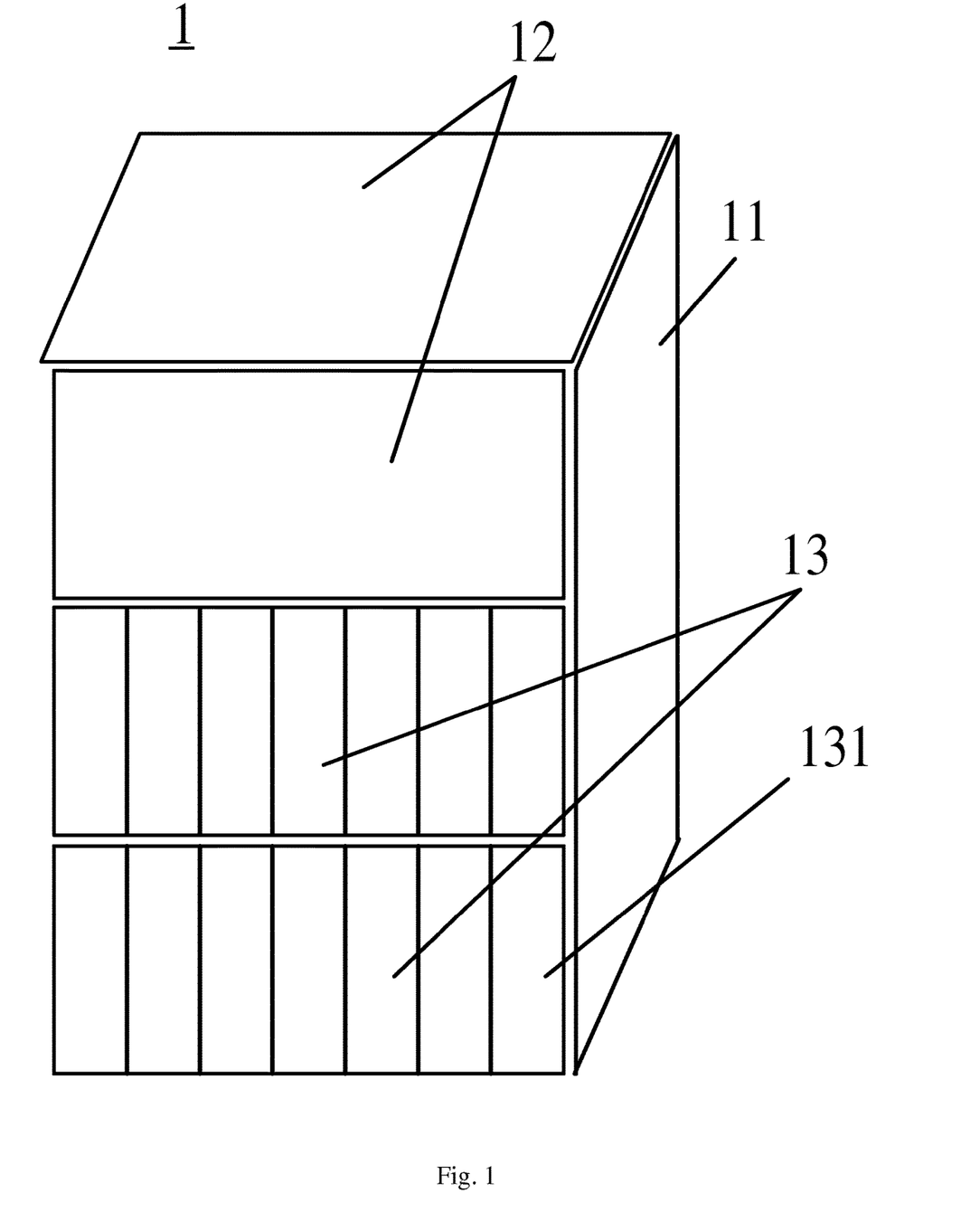
FIG. 1 is a front view of a tissue processor according to an embodiment of the present disclosure.

FIG. 1 is a schematic diagram of a tissue processor according to an embodiment of the present disclosure. As illustrated in FIG. 1, the tissue processor 1 may include a body 11, a processing retort 12 and a reagent management device 13. The reagent management device 13 may accommodate a plurality of reagent bottles 131. The plurality of reagent bottles 131 are filled with different reagents, for example, 100% ethanol, 90% ethanol, 80% ethanol, 75% ethanol, xylene, paraffin, and the like. At least one dispensing valve and a plurality of dispensing conduits (not illustrated) are also provided in the tissue processor 1. The reagent in the reagent bottle 131 flows into the processing retort 12 through the corresponding dispensing valve and dispensing conduit. The specimen may be automatically exposed in a sequence of reagents in the processing retort 12 to realize such as fixing, dehydration, clearing, embedding, and the like. The sequence of reagents in the processing retort 12 may be eliminated from the tissue processor 1 through the corresponding dispensing conduit or returned to the reagent bottles 131 through the corresponding dispensing conduits in sequence.

Other devices may also be provided in the tissue processor 1, for example, a cassette basket, a protective device, and the like. Since there devices of the tissue processor 1 do not have a substantial impact on understanding the embodiments of the present disclosure, they are omitted herein and will not be described in detail.

When the specimen is automatically exposed in the sequence of reagents in the processing retort 12, the reagents dispensed into the processing retort 12 are consumed. For example, in the dehydration, water molecules in the specimen are replaced by molecules of the reagent, such as the water molecules in the specimen are replaced by ethanol molecules, such that the water molecules in the specimen may flow into the reagent, and the molecules of the reagent may flow into the specimen. As a result, a concentration of the reagent decreases. For another example, the reagent may stick to the specimen, causing a drop in the concentration of the reagent. If the concentration of the reagent drops to a certain threshold, it will affect the process effect. Therefore, the operator needs to replace the expired or deteriorated reagent in the reagent bottle. The operator takes out the reagent bottle 131 containing the reagent from the reagent management device 13, dumps the expired or deteriorated reagent in the reagent bottle 131, washes the reagent bottle 131, fills the reagent bottle 131 with the fresh reagent, and places the reagent bottle 131 with the fresh reagent back in the reagent management device 13.

In the above process of replacing the reagent, it is easy to cause an operation error. For example, the operator fails to replace the expired or deteriorated reagent in time, or the operator replace the wrong reagent into the reagent bottle. In order to intuitively indicate the operator to enable the operator to be aware of the reagent status in time, the embodiments of the present disclosure provide an apparatus for indicating a reagent status in a reagent bottle in a tissue processor.

Figure 2:
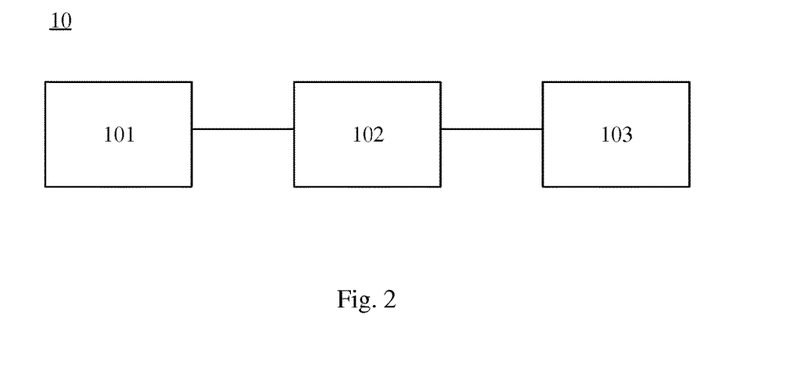
FIG. 2 is a block diagram illustrating an apparatus for indicating a reagent status in a reagent bottle in a tissue processor according to an embodiment of the present disclosure.

FIG. 2 is a block diagram illustrating an apparatus for indicating a reagent status in a reagent bottle in a tissue processor according to an embodiment of the present disclosure. As illustrated in FIG. 2, the apparatus 10 includes a detector 101, a controller 102, and an indicator 103. The detector 101 is configured to detect the reagent status. The controller 102 is configured to generate a control signal based on the reagent status. The indicator 103 is configured to generate a signal for indicating the reagent status based on the control signal.

In an embodiment of the present disclosure, the reagent status may include a normal status, a status requiring an operator's attention, or an expired or deteriorated status. The detector 101 may represent different statuses as different digital information, such as different logical codes, and send the digital information to the controller 102. The controller 102 may recognize the digital information, generate the corresponding control signal and send the control signal to the indicator 103. The indicator 103 may generate a signal for indicating the reagent status based on the control signal.

With the apparatus according to the embodiments of the present disclosure, it may intuitively indicate the reagent status for the operator based on the signal generated by the indicator for indicating the reagent status, such that the operator may replace the reagent timely and accurately, avoiding reagent replacement error.

In an embodiment of the present disclosure, the detector 101 may detect a density value of the reagent using a densitometer. The controller 102 may determine the reagent status based on the detected density value.

In an embodiment of the present disclosure, the detector 101 may further calculate the first number of specimens that the reagent has processed and acquire the second number of specimens that the reagent can handle, and determine the reagent status based on the first number and the second number. For example, for a certain reagent, the number of specimens that this reagent can handle is 3000. When the detector 101 calculates 0 to 1500 specimens, the reagent status may be determined as the normal status; when the detector 101 calculates 1501~2500 specimens, the reagent status may be determined as the status requiring the operator's attention; and when the detector 101 calculates 2501 specimens, the reagent status may be determined as the expired or deteriorated status. It should be understood that the above examples are only intended to enable those skilled in the art to understand the embodiments of the present disclosure, and are not intended to limit the scope of the present disclosure.

In an embodiment of the present disclosure, the controller 102 may be arranged to a central controller of the tissue processor 1, or independently at a proper position of the tissue processor 1, for example an inner wall of the body 11.

In an embodiment of the present disclosure, the indicator 103 is disposed to be corresponding to the reagent bottle 131.

The arrangement of the detector 101, controller 102 and indicator 103 relates to their corresponding implementation.

Figure 3:
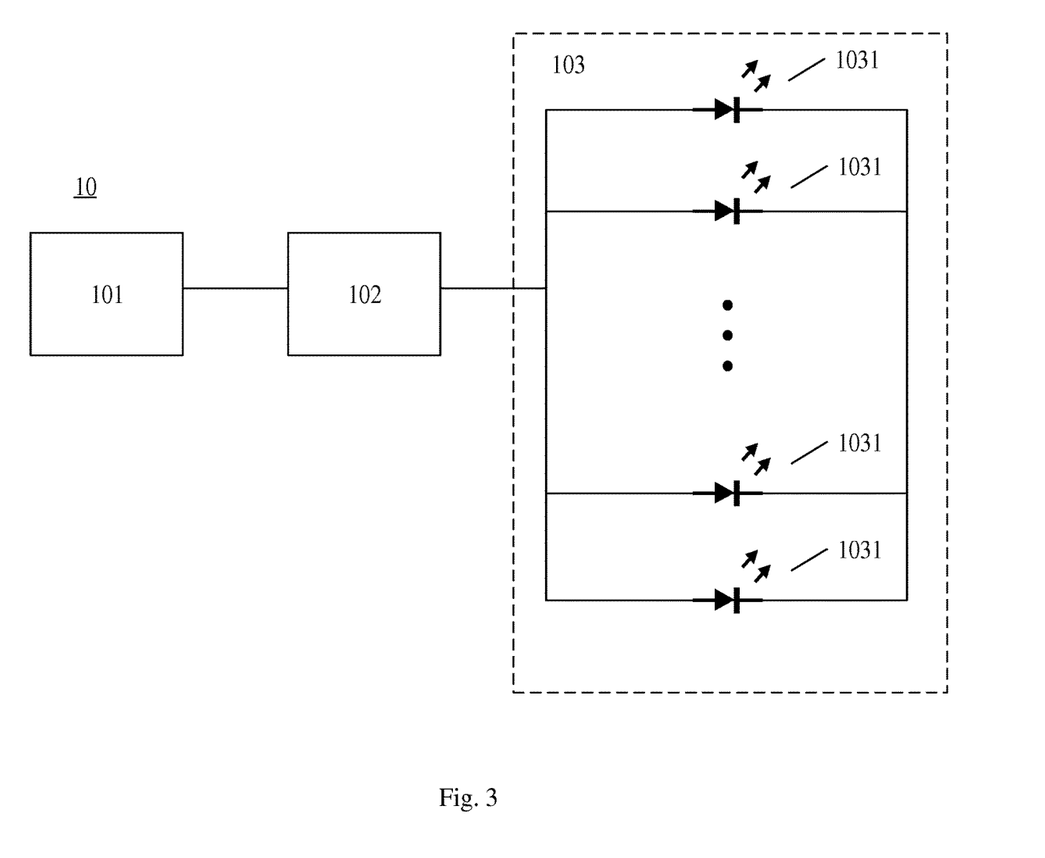
FIG. 3 is a block diagram illustrating an apparatus for indicating a reagent status in a reagent bottle in a tissue processor according to another embodiment of the present disclosure.

In an embodiment of the present disclosure, the signal for indicating the reagent status may be a visual signal. For example, as illustrated in FIG. 3, the indicator 103 includes a plurality of display modules 1031. Each display module 1031 includes at least one signal lamp. For example, in the embodiment of FIG. 3, each display module 1031 includes one signal lamp. The signal lamp may be a Light Emitting Diode (LED). It should be understood by those skilled in the art that, based on an implementation scenario, each display module 1031 also may include two signal lamps, three signal lamps, or the like, which is not limited by the embodiments of the present disclosure.

With the above embodiments, the reagent status may be visually and intuitively indicated for the operator, such that the operator may replace the reagent timely and accurately, and the reagent replacement error is avoided.

Figure 4:
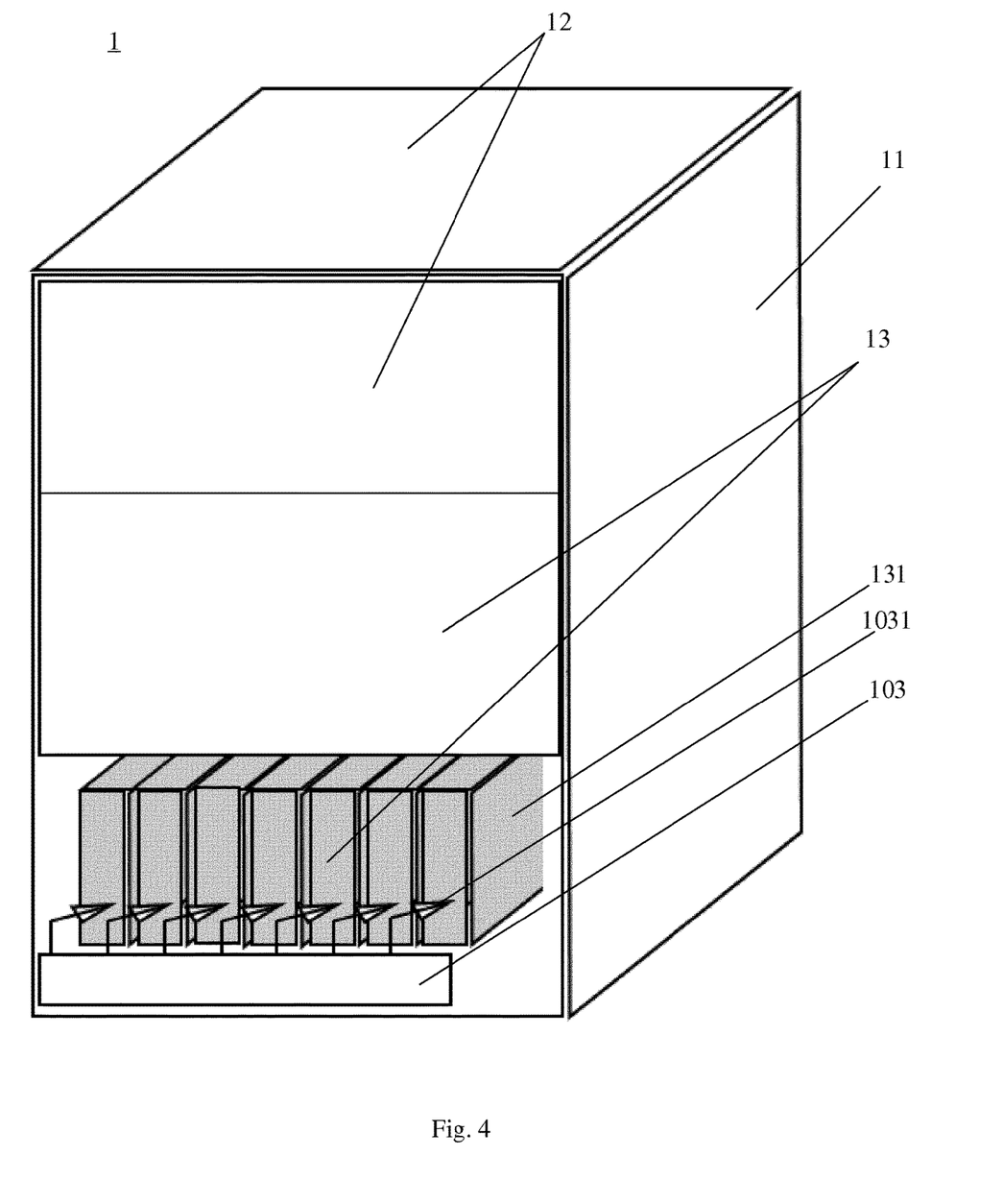
FIG. 4 is a back view of a tissue processor according to an embodiment of the present disclosure.

The plurality of display modules 1031 are in one-to-one correspondence with the plurality of reagent bottles 131. In an embodiment of the present disclosure, as illustrated in FIG. 4, one display module 1031 corresponds to one reagent bottle 131. The plurality of display modules 1031 serves as backlight modules of the plurality of reagent bottles 131, respectively. The signal lamp in each display module 1031 may emit different light based on the control signal to illuminate the corresponding reagent bottle 131.

In an embodiment of the present disclosure, at least one signal lamp is configured to emit predetermined light in accordance with the control signal. The predetermined light includes one of light with a first predetermined color, light with a second predetermined color, and light that flashes at a predetermined flashing frequency. The control signal may be a current signal or a voltage signal. The signal lamp emits light with different colors based on different current signals or different voltage signals. The control signal also may be a pulse current signal or a pulse voltage signal. The signal lamp emits light that flashes at the predetermined flashing frequency based on the pulse current signal or the pulse voltage signal.

In an embodiment of the present disclosure, the controller 102 is configured to generate a first control signal when the reagent status is within a threshold range. The at least signal lamp is configured to emit the light with the first predetermined color based on the first control signal. For example, a difference of decreasing in the concentration of ethanol is within (0.1% to 1%], the reagent statues may be determined as the normal statues. The controller 102 generates the first control signal. The at least one signal lamp emits green or blue light based on the first control signal.

In an embodiment of the present disclosure, the controller 102 is configured to generate a second control signal when the reagent status is within a forewarning threshold range. The at least signal lamp is configured to emit the light with the second predetermined color based on the second control signal. For example, the difference of decreasing in the concentration of ethanol is within (1%~5%], the reagent statues may be determined as the statues requiring the operator's attention. The controller 102 generates the second control signal. The at least one signal lamp emits orange or red light based on the second control signal.

In an embodiment of the present disclosure, the controller 102 is configured to generate a third control signal when the reagent status is within an alarm threshold range. The at least signal lamp is configured to emit the light that flashes at the predetermined flashing frequency based on the third control signal. For example, the difference of decreasing in the concentration of ethanol is 5% or less, the reagent statues may be determined as the expired or deteriorated statues. The controller 102 generates the third control signal. The at least one signal lamp emits the light that flashes at the predetermined flashing frequency based on the third control signal.

It should be understood that the above numerical examples are only intended to enable those skilled in the art to understand the embodiments of the present disclosure, and are not intended to limit the scope of the present disclosure.

Figure 5:
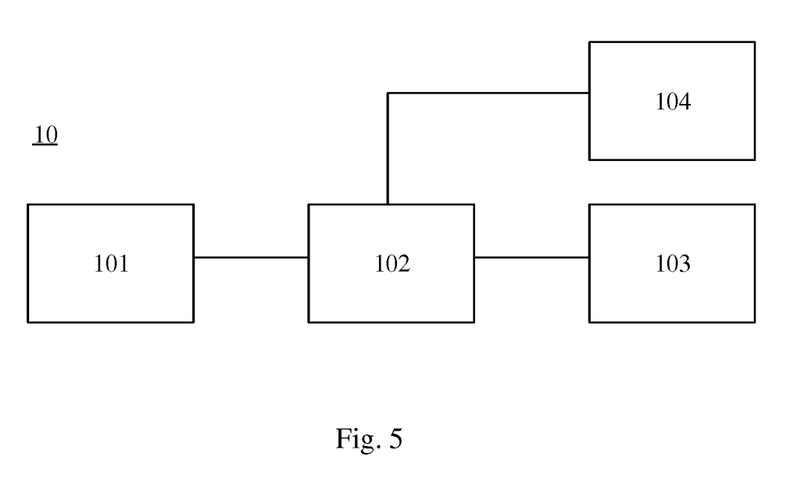
FIG. 5 is a block diagram illustrating an apparatus for indicating a reagent status in a reagent bottle in a tissue processor according to still another embodiment of the present disclosure.
Figure 6:
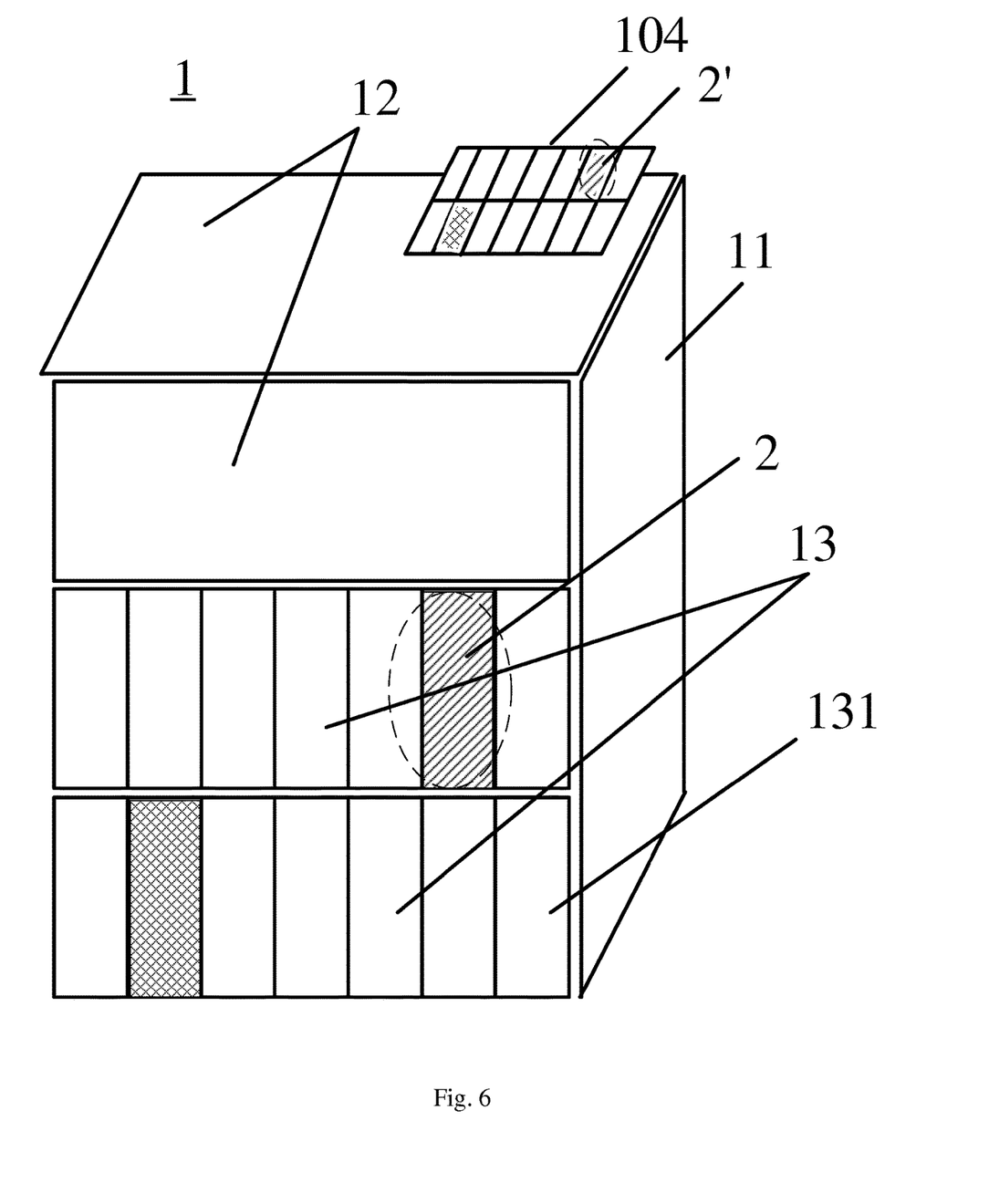
FIG. 6 is a front view of a tissue processor according to another embodiment of the present disclosure.

In an embodiment of the present disclosure, as illustrated in FIG. 5, the apparatus 10 may also include a touch control screen 104. The touch control screen 104 is configured to synchronously display the signal for indicating the reagent status. As illustrated in FIG. 6, the touch control screen 104 may be placed over the processing retort 12 to facilitate the operator. As illustrated in FIG. 6, the signal 2 generated by the indicator 103 is synchronized as the signal 2' displayed on the touch control panel 104. It should also be understood that the touch control screen 104 may also display other operations of the tissue processor 1 and corresponding statuses, etc., which are not described in detail herein.

Figure 7:
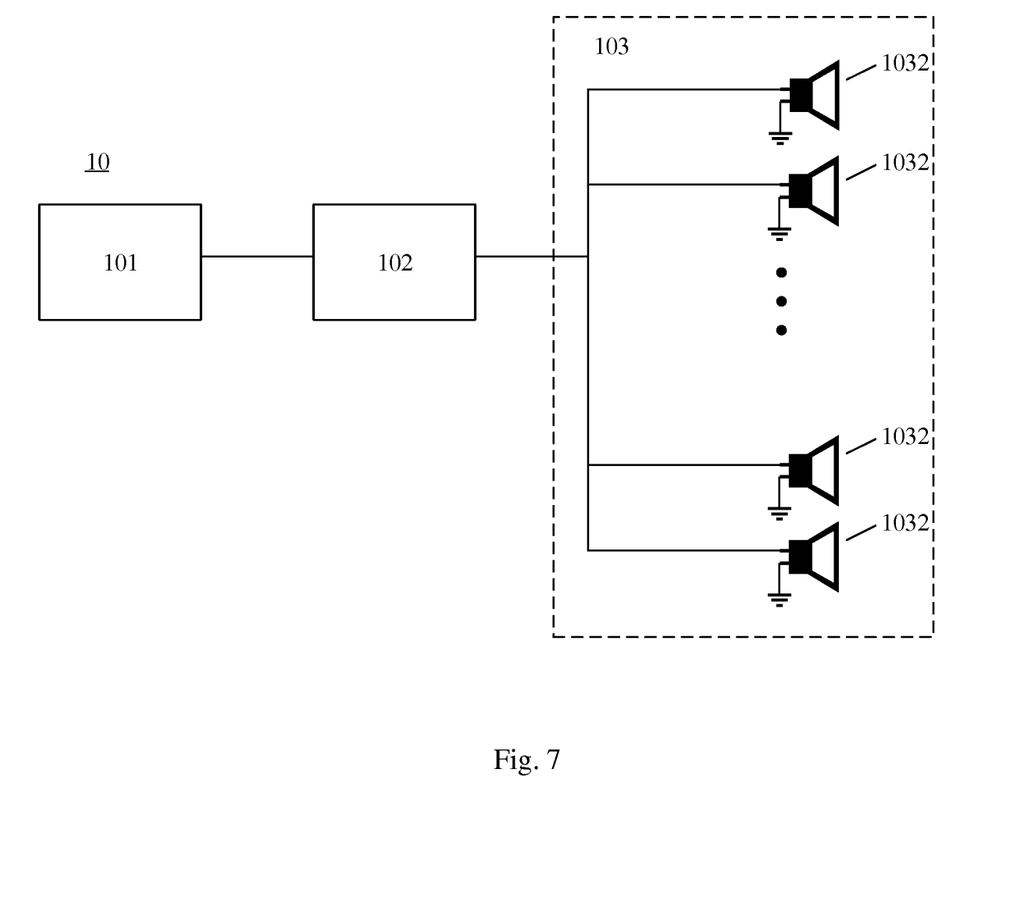
FIG. 7 is a block diagram illustrating an apparatus for indicating a reagent status in a reagent bottle in a tissue processor according to yet still another embodiment of the present disclosure.

In an embodiment of the present disclosure, the signal for indicating the reagent status may be an audible signal. For example, as illustrated in FIG. 7, the indicator 103 includes a plurality of buzzers 1032. The plurality of buzzers 1032 are in one-to-one correspondence with a plurality of reagent bottles 131. The plurality of buzzers 1032 are respectively disposed in front of the plurality of reagent bottles 131. Each buzzer 1302 are configured to emit a sound signal with a preset frequency based on the control signal.

With the above embodiments, the reagent status may be acoustically and intuitively indicated for the operator, such that the operator may replace the reagent timely and accurately, and the reagent replacement error is avoided.

In an embodiment of the present disclosure, the controller 102 is configured to generate a first control signal when the reagent status is within a threshold range. The buzzer 1302 is configured to emit a sound signal with a first preset frequency based on the first control signal. For example, a difference of decreasing in the concentration of ethanol is within (0.1% to 1%], the reagent statues may be determined as the normal statues. The controller 102 generates the first control signal. The buzzer 1302 emits a normal "drip" sound based on the first control signal.

In an embodiment of the present disclosure, the controller 102 is configured to generate a second control signal when the reagent status is within a forewarning threshold range. The buzzer 1302 is configured to emit a sound signal with a second preset frequency based on the second control signal. The second preset frequency is greater than the first preset frequency. For example, the difference of decreasing in the concentration of ethanol is within (1%~5%], the reagent statues may be determined as the statues requiring the operator's attention, and the controller 102 generates the second control signal. The buzzer 1302 emits a slightly higher frequency "drip" sound based on the second control signal.

In an embodiment of the present disclosure, the controller 102 is configured to generate a third control signal when the reagent status is within an alarm threshold range. The buzzer 1302 is configured to emit a sound signal with a third preset frequency based on the third control signal. The third preset frequency is greater than the second preset frequency. For example, the difference of decreasing in the concentration of ethanol is 5% or less, the reagent statues may be determined as the expired or deteriorated statues. The controller 102 generates the third control signal. The buzzer 1302 emits a higher frequency "drip" sound based on the third control signal.

In order to realize the above embodiments, embodiments of the present disclosure provide a method for indicating a reagent status in a reagent bottle in a tissue processor.

Figure 8:
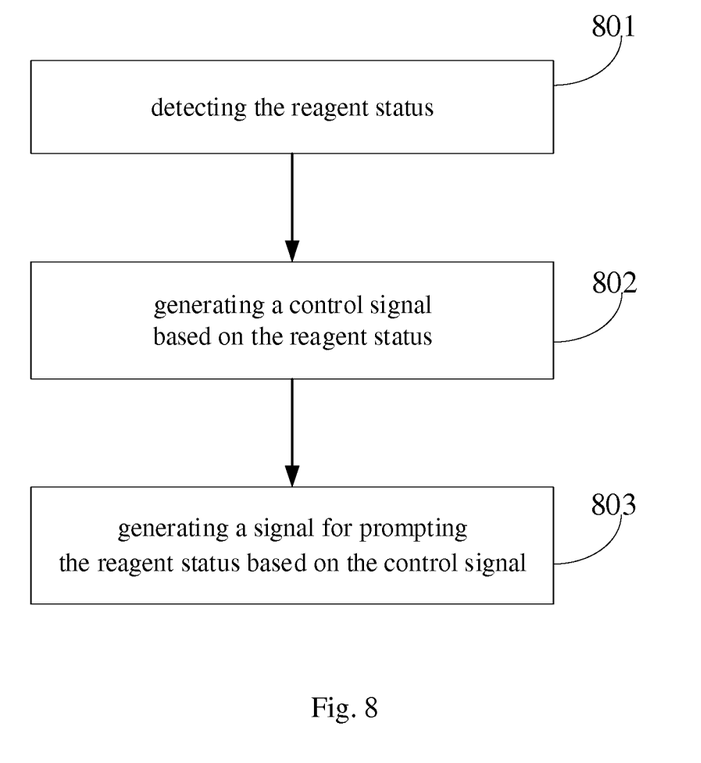
FIG. 8 is a flow chart showing a method for indicating a reagent status in a reagent bottle in a tissue processor according to an embodiment of the present disclosure.

FIG. 8 is a flow chart showing a method for indicating a reagent status in a reagent bottle in a tissue processor according to an embodiment of the present disclosure. As illustrated in FIG. 8, the method includes following operations.

At block 801, the reagent status is detected.

At block 802, a control signal is generated based on the reagent status.

At block 803, a signal for indicating the reagent status is generated based on the control signal.

With the method according to the embodiments of the present disclosure, it may intuitively indicate the reagent status for the operator based on the signal for indicating the reagent status, such that the operator may replace the reagent timely and accurately, avoiding reagent replacement error.

In an embodiment of the present disclosure, the signal for indicating the reagent status is generated based on the control signal as follows. Predetermined light is emitted based on the control signal.

In an embodiment of the present disclosure, the predetermined light includes one of light with a first predetermined color, light with a second predetermined color, and light that flashes at a predetermined flashing frequency.

In an embodiment of the present disclosure, the predetermined light is emitted based on the control signal as follows. When the reagent status is within a threshold range, the light with the first predetermined color is emitted. When the reagent status is within a forewarning threshold range, the light with the second predetermined color is emitted. When the reagent status is within an alarm threshold range, the light that flashes at the predetermined flashing frequency is emitted.

In an embodiment of the present disclosure, the signal for indicating the reagent status is generated based on the control signal as follows. A sound signal with a preset frequency is emitted based on the control signal.

In an embodiment of the present disclosure, the method further includes following operations. It is detected whether the reagent bottle is placed in the tissue processor. A turn-off signal is generated when detecting that the reagent bottle is not placed in the tissue processor. The signal for indicating the reagent status is turned off based on the turn-off signal.

With respect to specific implementation of the above method, reference can be made to the above-described embodiment of the apparatus, which will not be elaborated herein.

Figure 9:
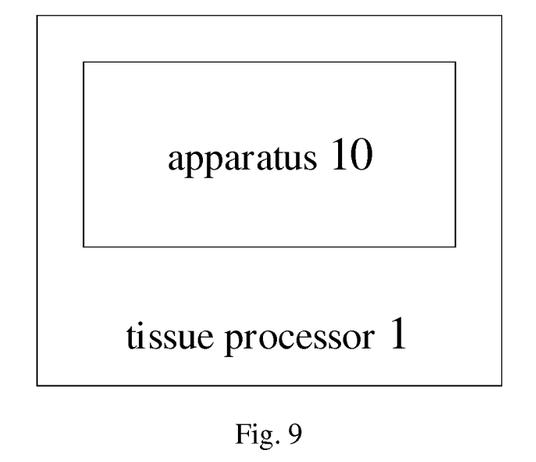
FIG. 9 is a block diagram illustrating a tissue processor according to an embodiment of the present disclosure.

In addition, as illustrated in FIG. 9, embodiments of the present disclosure also provide a tissue processor including the above apparatus 10 for indicating a reagent status in a reagent bottle in a tissue processor.

With the tissue processor according to the embodiments of the present disclosure, it may intuitively indicate the reagent status for the operator based on the signal generated by the indicator for indicating the reagent status, such that the operator may replace the reagent timely and accurately, avoiding reagent replacement error.

It is to be understood that, in the description, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

In the present utility model, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present utility model. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present utility model. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present utility model, and changes, alternatives, and modifications can be made in the embodiments without departing from spirit, principles and scope of the present utility model.

What is claimed is:

1. An apparatus for indicating a reagent status of a reagent in a reagent bottle in a tissue processor, wherein the tissue processor houses a plurality of reagent bottles containing reagents such that a front face of each of the plurality of reagent bottles is visible from a viewpoint at a front of the tissue processor, the apparatus comprising:
- a detector, configured to detect the reagent status, wherein the detector includes a densitometer which detects a density value of the reagent while the reagent is in the reagent bottle and while the reagent bottle is arranged in the tissue processor for dispensing the reagent to a processing retort of the tissue processor, wherein the reagent status is based on the detected density value;
- a controller, configured to generate a control signal based on the reagent status; and
- an indicator, configured to generate a signal for indicating the reagent status based on the control signal;
- wherein the indicator includes a plurality of display modules associated with the plurality of reagent bottles in the tissue processor;
- wherein each of the plurality of display modules has at least one signal lamp arranged behind an associated one of the plurality of reagent bottles to emit different light based on the control signal to illuminate the associated reagent bottle from behind the associated reagent bottle;
- wherein the plurality of display modules are in one-to-one correspondence with the plurality of reagent bottles in the tissue processor;
- wherein the at least one signal lamp is configured to emit predetermined light based on the control signal, the predetermined light comprising one of light with a first predetermined color, and light that flashes at a predetermined flashing frequency;
- wherein light emitted by the at least one signal lamp is visible on the front face of the illuminated reagent bottle from a viewpoint at the front of the tissue processor;
- wherein the controller is configured to generate a first control signal, and the at least one signal lamp is configured to emit the light with the predetermined color based on the first control signal, to indicate the reagent status is within a threshold range; and
- wherein the controller is configured to generate a second control signal, and the at least one signal lamp is configured to emit the light that flashes at the predetermined flashing frequency based on the second control signal, to indicate the reagent status is within an alarm threshold range.

2. The apparatus of claim 1, wherein the predetermined light further comprises light with a second predetermined color.

3. The apparatus of claim 2, wherein:
- the controller is configured to generate a third control signal, and the at least one signal lamp is configured to emit the light with the second predetermined color based on a third control signal, to indicate the reagent status is within a forewarning threshold range.

4. The apparatus of claim 1, wherein the indicator further includes a plurality of buzzers, the plurality of buzzers being in one-to-one correspondence with the plurality of reagent bottles in the tissue processor, and the plurality of buzzers being configured to emit a sound signal with a preset frequency based on the control signal.

5. The apparatus of claim 1, wherein the detector is further configured to detect whether the reagent bottle is placed in the tissue processor;
- the controller is further configured to generate a turn-off signal when detecting that the reagent bottle is not placed in the tissue processor;
- the indicator is further configured to turn off the signal for indicating the reagent status based on the turn-off signal.

6. The apparatus of claim 1, further comprising:
- a touch control screen, configured to synchronously display the signal for indicating the reagent status.

7. A method for indicating a reagent status of a reagent in a reagent bottle in a tissue processor, wherein the tissue processor houses a plurality of reagent bottles containing reagents such that a front face of each of the plurality of reagent bottles is visible from a viewpoint at a front of the tissue processor, the method comprising:
- detecting a density value of the reagent while the reagent is in the reagent bottle and while the reagent bottle is arranged in the tissue processor for dispensing the reagent to a processing retort of the tissue processor;
- determining the reagent status based on the detected density value;
- generating a control signal based on the reagent status;
- generating a signal for indicating the reagent status based on the control signal by emitting predetermined light from behind the reagent bottle to illuminate the reagent bottle from behind the reagent bottle, wherein the predetermined light is based on the control signal and is visible on the front face of the illuminated reagent bottle from a viewpoint at the front of the tissue processor;
- wherein the predetermined light comprises one of light with a first predetermined color and light that flashes at a predetermined flashing frequency; and
- wherein emitting the predetermined light based on the control signal comprises:
- emitting the light with the predetermined color to indicate the reagent status is within a threshold range; and
- emitting the light that flashes at the predetermined flashing frequency to indicate the reagent status is within an alarm threshold range.

8. The method of claim 7, wherein the predetermined light further comprises light with a second predetermined color.

9. The method of claim 8, wherein, emitting the predetermined light based on the control signal further comprises:
- emitting the light with the second predetermined color to indicate the reagent status is within a forewarning threshold range.

10. The method of claim 7, wherein, generating the signal for indicating the reagent status based on the control signal comprises:
- emitting a sound signal with a preset frequency based on the control signal.

11. The method of claim 7, further comprising:
detecting whether the reagent bottle is placed in the tissue processor;
- generating a turn-off signal when detecting that the reagent bottle is not placed in the tissue processor;
- turning off the signal for indicating the reagent status based on the turn-off signal.

12. A tissue processor, comprising:
- a processing retort;
- a reagent management device below the processing retort configured to accommodate a plurality of reagent bottles respectively containing liquid reagents, wherein the plurality of reagent bottles are in flow communication with the processing retort for supplying reagent to the processing retort, and wherein each of the plurality of reagent bottles has a front face visible by viewing a front of the tissue processor and a rear face opposite the front face;

a detector configured to detect a reagent status of a reagent in one of the plurality of reagent bottles, wherein the detector includes a densitometer which detects a density value of the reagent while the reagent is in the one reagent bottle and while the one reagent bottle is arranged in the tissue processor, wherein the reagent status is based on the detected density value;

a controller configured to generate a control signal based on the reagent status; and an indicator configured to generate a signal for indicating the reagent status based on the control signal;

wherein the indicator includes a plurality of display modules associated with the plurality of reagent bottles in the tissue processor;

wherein each of the plurality of display modules has at least one signal lamp arranged behind the rear face of an associated one of the plurality of reagent bottles to emit different light based on the control signal to illuminate the rear face of the associated reagent bottle from behind the associated reagent bottle; and wherein light emitted by the at least one signal lamp is visible on the front face of the illuminated reagent bottle by viewing the front of the tissue processor, wherein the at least one signal lamp is configured to emit predetermined light based on the control signal, the predetermined light comprising one of light with a first predetermined color, and light that flashes at a predetermined flashing frequency;

wherein the controller is configured to generate a first control signal, and the at least one signal lamp is configured to emit the light with the predetermined color based on the first control signal, to indicate the reagent status is within a threshold range; and wherein the controller is configured to generate a second control signal, and the at least one signal lamp is configured to emit the light that flashes at the predetermined flashing frequency based on the second control signal, to indicate the reagent status is within an alarm threshold range.

13. The tissue processor of claim 12, wherein the indicator further includes a plurality of audible signal generators associated with the plurality of reagent bottles in the tissue processor, wherein the plurality of audible signal generators are configured to emit a sound signal with a preset frequency based on the control signal.

14. The tissue processor of claim 13, wherein the plurality of audible signal generators are arranged in front of the plurality of reagent bottles in one-to-one correspondence with the plurality of reagent bottles.

* * * * *